United States Patent [19]

Lanius

[11] Patent Number: 4,768,651
[45] Date of Patent: * Sep. 6, 1988

[54] SATCHEL-STYLE TACKLE BOX

[75] Inventor: Charles A. Lanius, Prairie du Sac, Wis.

[73] Assignee: Flambeau Corporation, Baraboo, Wis.

[*] Notice: The portion of the term of this patent subsequent to Mar. 8, 2005 has been disclaimed.

[21] Appl. No.: 77,611

[22] Filed: Jul. 24, 1987

Related U.S. Application Data

[63] Continuation-in-part of Ser. No. 890,837, Jul. 25, 1986, Pat. No. 4,729,474.

[51] Int. Cl.$^4$ .............................................. B65D 85/00
[52] U.S. Cl. ............................ 206/315.11; 206/315.1; 206/373; 312/DIG. 33
[58] Field of Search ..................... 206/372, 373, 315.1, 206/315.11; 312/DIG. 33; 43/54.1, 57.1; 220/329, 333

[56] References Cited

U.S. PATENT DOCUMENTS

| | | | |
|---|---|---|---|
| 1,752,948 | 4/1930 | Herrmann | 43/54.1 X |
| 3,003,618 | 10/1961 | Lebedzinski | 206/373 |
| 3,148,811 | 9/1964 | Foltz | 43/54.1 X |
| 3,171,566 | 3/1965 | Mitchell | 206/315.11 X |
| 3,191,765 | 6/1965 | Dozier | 206/373 X |
| 3,350,810 | 11/1967 | Warner et al. | 206/315.11 X |
| 4,023,304 | 5/1977 | Singer | 43/54.1 |
| 4,128,170 | 12/1978 | Elliott | 206/315.11 |
| 4,353,182 | 10/1982 | Junkas et al. | 206/315.11 X |
| 4,412,616 | 11/1983 | Williams | 220/329 X |

FOREIGN PATENT DOCUMENTS 56589 7/1952 France .................................. 220/333

Primary Examiner—David T. Fidei
Attorney, Agent, or Firm—Allegretti & Witcoff, Ltd.

[57] ABSTRACT

A satchel-style tackle box, that has storage compartments for tackle, baits, fishing accessories and other equipment, is disclosed. The box permits ready and facile access to all the storage compartments when the box is disposed in its horizontal in-use position. Some of the storage compartments are accessible through the open upper end of the box. A lid assembly is hingedly connected with the upper, rear edge of the box and may be used to selectively close the upper end of the box. The lid assembly has two parts, a front part and a rear part that is connected with the box. The front part may be selectively opened, without opening the remainder of the lid assembly, so as to permit selective access to the front most storage compartment.

11 Claims, 3 Drawing Sheets

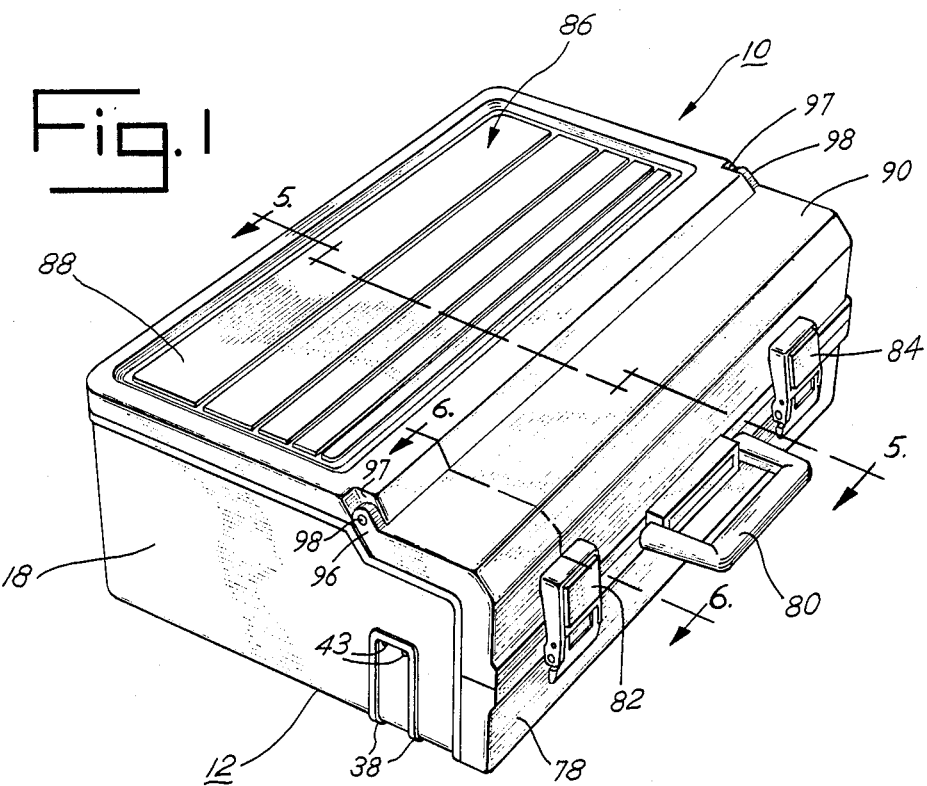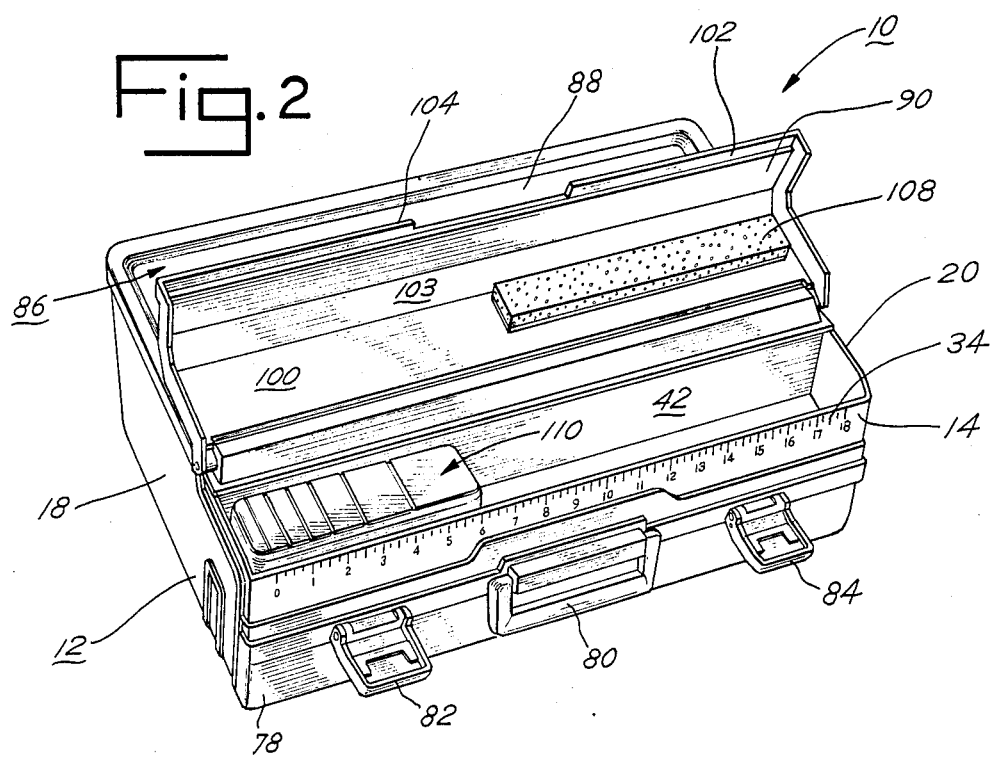

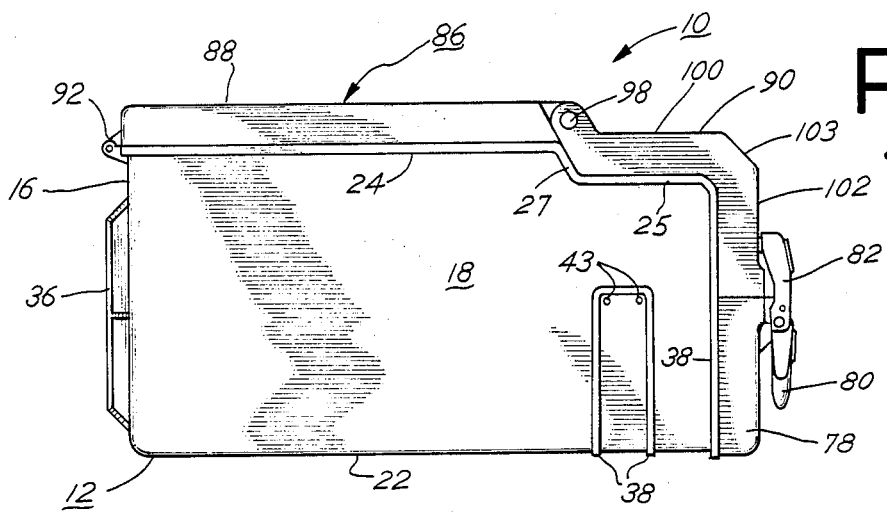
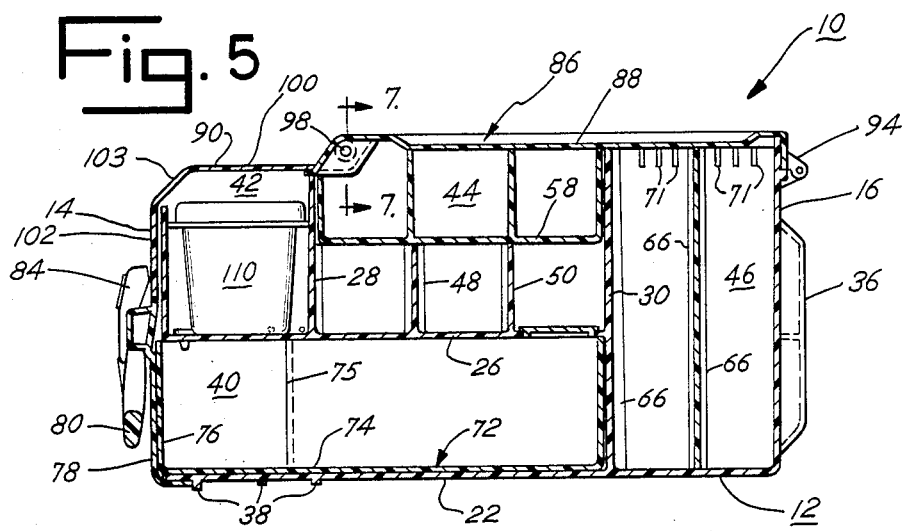
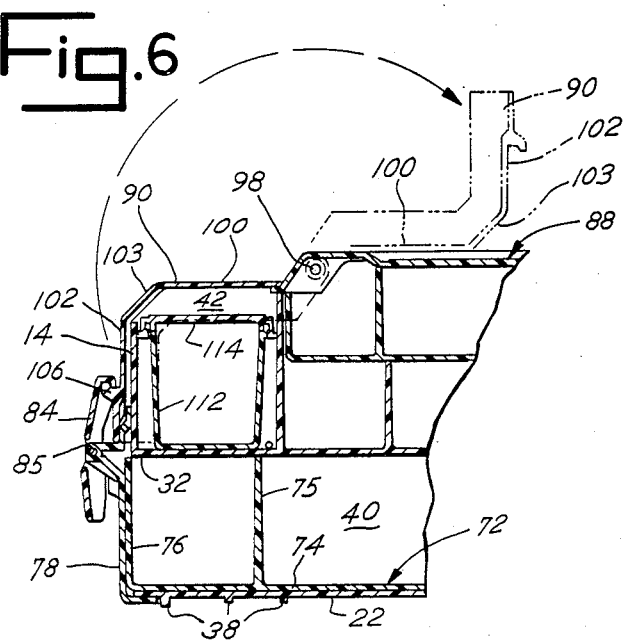

SATCHEL-STYLE TACKLE BOX

This application is a continuation-in-part of pending U.S. application Ser. No. 890,837, now U.S. Pat. No. 4,729,474, filed July 25, 1986, and assigned to the same assignee as the present application.

BACKGROUND OF THE INVENTION

The present invention relates generally to fishermen's tackle boxes or containers. More specifically, this invention relates to a special type of tackle box known as a satchel-style box. Such satchel-style tackle boxes could, of course, also be used by persons other than fisherman as, for example, hobbyists, handymen, workmen, etc.

Satchel-style tackle boxes have been known and used in the past. Generally they have a rectangular parallelipiped shape. It is thought that they derive their name from the similarity of their overall, outer shape to that of satchel style brief or attache cases. Satchel-type tackle boxes usually do not have the stacked, foldable multiple tray arrangements found in more traditional styles of tackle boxes.

In the past, access to the interior storage compartments in satchel-style tackle boxes has been through a lid-closed upper end of the box and a lid-closed bottom of the box. To gain access to a storage compartment adjacent to the upper end of a prior satchel-style box, the box is disposed horizontally with the bottom of the box being placed on the ground, dock or other surface. The lid covering the upper end of the box is then opened. Thereafter, to gain access to a storage compartment adjacent to the bottom of the box, the upper lid must be closed, the box turned or flipped over so that the upper end is placed on the ground, dock or other surface, and the lid covering the bottom of the box opened. This need to turn or flip the box over in order to gain access to all the storage compartments in the box has been and is a disadvantage. It is cumbersome and burdensome. Besides, turning the box over causes the contents of the box to become disorganized and tangled.

Also in the past, satchel-style tackle boxes have included a handle on their front wall. The handle enables the fishermen, hobbyists, handymen, workmen, etc. to carry such a box in an upright-carry position wherein the upper end and bottom of the box are substantially perpendicular to the ground.

Recently applicant's assignee introduced a new satchel-style tackle box that provides a practical solution to this longstanding serious problem with the prior satchel-style boxes. This new satchel-style box provides large, workable and versatile storage space, in three levels, that surpasses that of prior tackle boxes. Unlike the prior satchel-style tackle boxes, this new box includes a upwardly-facing drawer in its front wall, adjacent to the carrying handle. Access to the other storage space in the box is had solely through the lid covering the upper end of the box. Thus ready access to all its storage space is available without the inconvenience of having to flip or turn the box over. A description of this new box is found in co-pending U.S. application Ser. No. 890,837 filed July 25, 1986. This application is incorporated herein by reference thereto.

Applicant's assignee has also recently introduced a new traditional style tackle box, that is, one having an internal stacked, foldable multiple tray arrangement. One of the novel features of this tackle box is that a part of the top tray, in the multiple tray arrangement, may be selectively removed from the tray arrangement and mounted on the front of the box. The lid of the box may be closed while this part is mounted on the front of the box. This novel feature permits a day's worth of baits and supplies to be readily accessible to a fisherman without the need to open the box lid. All the other baits and supplies remain inside the tackle box and are protected from the outside elements and accidental spillage. This new, traditional-style tackle box is described in co-pending U.S. application Ser. No. 037,688, now U.S. Pat. No. 4,739,577, filed Apr. 13, 1987. That application is also incorporated herein by reference thereto.

SUMMARY OF THE INVENTION

In principal aspect, the present invention comprises an improved satchel-style tackle box particularly adapted for permitting ready and facile access to all stored tackles, baits, fishing accessories, and other equipment when the box is disposed in its horizontal in-use position and for storing and transporting the tackle, baits, fishing accessories, and other equipment while the box is disposed in its upright-carry position. The box has a pull out, upwardly-facing drawer in its front wall that extends into the lower part of the box. Other storage compartments are defined in the box above and about the drawer storage compartment. Access to all these other storage compartments is had through the upper, open end of the box. Hence, there is no need to turn or flip the box over in order to obtain access to any of its storage compartments.

A lid assembly is hinged to the rear wall of the box. It is adapted to be moved between a first, closed position where the lid assembly overlies and closes the open upper end of the box and a second, open position where the lid assembly is pivoted away from the upper open end and permits the fisherman, hobbyists, handymen, workman, etc. using the box to have access to the things stored in the other storage compartments in the box.

One of these other storage compartments is disposed adjacent to the front wall of the box. This front compartment extends between the side walls of the box and is relatively narrow, in the front to back direction.

The lid assembly has two parts, a front part and a rear part. The dimensions of the front part generally correspond to those of the front compartment while the dimensions of the rear part generally correspond to those of the remainder of the upper end of the box. The rear edge of the front part is hinged to the front edge of the rear part, about an axis generally parallel to the plane of the front wall of the box. The front part may thus be pivoted relative to the rear part of the lid assembly. When the lid assembly is in its first, closed position, ready access may be had to the front storage compartment by simply lifting the front part of the lid assembly. This permits a fisherman, etc. to have facile access to the tackle, baits, accessories and equipment that are in the front compartment and that he will need during a day's fishing without having to expose the rest of the things stored in the box to the elements and to accidental spillage.

Accordingly, it is a primary object of the present invention to provide an improved satchel-style box of the type described wherein the lid assembly used to close the upper end of the box includes a part which may be selectively opened, without opening the remainder of the lid assembly, so as to permit selective access to one of the storage compartments in the box while the other storage compartments remain closed and protected. A related object of the present invention is to provide an improved satchel-style box wherein the lid assembly is hinged to the rear wall of the box and the selectively movable part of that assembly is hinged to the remainder of the assembly.

Another object of the present invention is to provide an improved satchel-style box of the type described wherein the handle for carrying the box, in its normal carry position, is mounted on the drawer and wherein the handle may be used to pull the drawer out of the drawer storage compartment when the box is in its normal use position. A related object of the present invention is to provide an improved satchel-style box wherein the same latch means is utilized to secure the lid assembly in its first, closed position and to hold the drawer within the drawer storage compartment when, for example, the box is in its upright-carry position and is being carried by the handle.

These and other objects, advantages and features of the present invention will be set forth in the detailed description of the preferred embodiment of the present invention which follows.

BRIEF DESCRIPTION OF THE DRAWINGS

In the detailed description of the preferred embodiment which follows, reference will be made to the drawings comprised of the following figures:

FIG. 1 is a front perspective view of the improved satchel-style tackle box of the present invention wherein the lid assembly and the upwardly-facing drawer are shown in their closed and latched positions; and FIG. 2 is another front perspective view of the box of FIG. 1 with the front part of the lid assembly shown in its open position; FIG. 4 is a left side elevational view of the box of FIG. 1; and FIG. 5 is a cross-sectional view taken along the line 5—5 in FIG. 1; and FIG. 6 is a partial cross-sectional view taken along the line 6—6 in FIG. 1; and FIG. 7 is a partial cross-sectional view taken along the line 7—7 in FIG. 5.

DESCRIPTION OF THE PREFERRED EMBODIMENT

Figure 3:
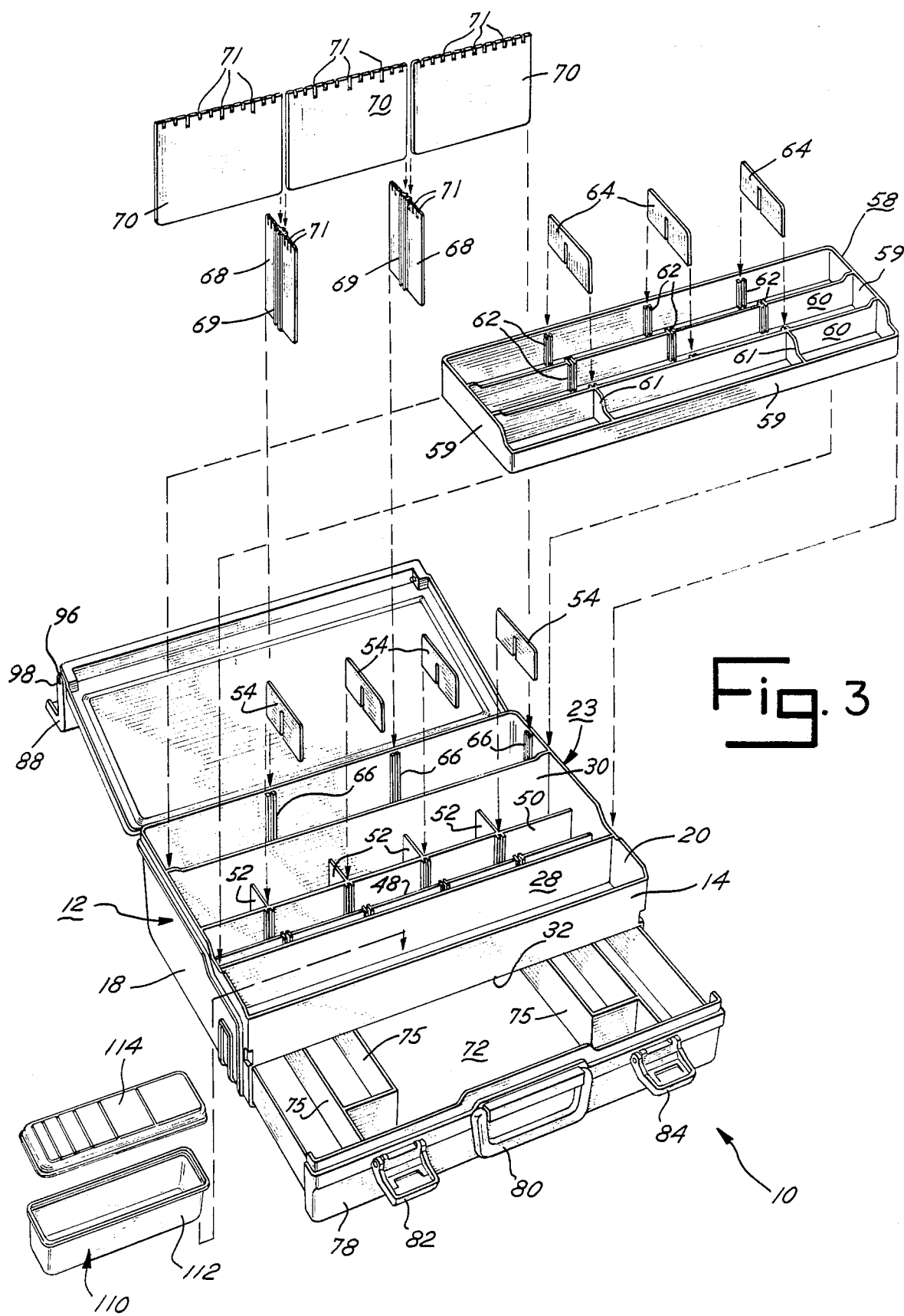
FIG. 3 is a partially exploded, front perspective view of the box of FIG. 1 wherein the lid assembly and the drawer are shown in their opened positions.

Referring now to FIGS. 1-5, a satchel-style tackle box of the present invention is shown generally at 10. It comprises a one-piece body 12 that may be molded from a plastic material such as polypropylene. The advantages of such a one-piece construction is in economy of manufacture and also in minimizing the leakage of unwanted water into the box 10 during usage.

The box 12 includes a front wall 14, a rear wall 16, a left side wall 18, a right side wall 20, and a bottom wall 22. The upper end of the body 12, generally designated at 23 in FIG. 3, is open.

The side walls 18 and 20 are mirror images of each other. As shown in FIG. 4, each has a forward portion 24 and rearward portion 25, with the height of the forward positions 24, as measured up from the bottom wall 22, being less than that of the rearward portions 25. The transition areas 27 between the portions 24 and 25 are smooth, step-downs and are located approximately one-quarter of the way from the front wall 14 back toward the rear wall 16.

The body 12 also includes integral, internal walls 26, 28, and 30. As best illustrated in FIG. 5, the wall 26 is horizontally disposed and is generally parallel to the bottom wall 22. The walls 28 and 30 are vertically disposed and are generally parallel to the front and rear walls 14 and 16. The forward end of the horizontal wall 26 contacts the front wall 14, approximately midway between its upper and lower edges. The wall 26 extends rearwardly toward the rear wall 16, and between the side walls 18 and 20. The vertical wall 28 extends between the side walls 18 and 20 and projects upwardly from the horizontal wall 26. It is generally the same height as the forward portions 24 of the side walls 18 and 20 and is disposed approximately one-quarter of the way from the front wall 14 back toward the rear wall 16. The vertical wall 30 also extends between the side walls 18 and 20 and projects upwardly from the bottom wall 22 so that its height is generally the same as the height of the rearward portions 25 of the side walls 18 and 20. The wall 30 is disposed about three-quarters of the way back from the front wall to the rear walls. The rearward end of the wall 26 contacts and is integral with the vertical wall 30 between its upper and lower ends.

The front wall 14 has opening 32 extending between the side walls 18 and 20 and between the wall 26 and the bottom wall 22. As seen in FIG. 2, ruler markings or divisions, generally shown at 34, may be formed across the upper portion of the front wall. These markings permit a fisherman to measure leaders and lines or to check for a legal catch.

The rear wall 16 includes integrally molded feet 36, as best shown in FIGS. 4 and 5. These feet 36 are adapted to support box 10 on its rear wall 16 when the box is disposed in its upright-carry position.

The bottom wall 22 includes three integrally molded ridges 38 that project downwardly from the plane of the wall. These ridges 38 are parallel to the front and rear walls 14 and 16, and extend from side to side across the bottom wall. As shown in FIGS. 1 and 4, the two most rearwardly disposed ridges continue and extend partially up the side walls 18 and 20. The forward-most ridge edge extends up to and toward the open end 24. In this respect, the ridges serve as decoration for the box. As noted, the box 12 rests on its bottom wall 22 when in its horizontal in-use position. The ridges 38 also serve to hold the forward part of the bottom wall slightly off the surface upon which the box rests, be it the ground, a dock, a boat deck or the like.

The walls of the body 12 define four separate storage compartments. More specifically, a first, lower compartment 40 is defined by the horizontal wall 26, the portion of the vertical wall 30 below the intersection between the horizontal and vertical walls 26 and 30, the portions of the side walls 18 and 20 below the horizontal wall 26, and the portion of the bottom wall 22 forward of the vertical wall 30. The opening 32 permits access to this first compartment 40.

A second, upper forward compartment 42 is defined by the horizontal wall 26, the vertical wall 28, the forward portions 25 of the side walls 18 and 20, the front wall 14 above the horizontal wall 26. The upper open end of the second compartment 42 constitutes a part of the upper open end 24 of the body 12. Small drain holes 43 in the side walls 18 and 20 serve to permit any water collected in the bottom of the second compartment 42 to drain from the compartment.

A third, rearward compartment 44 is defined by the wall 26, the wall 28, the portion of the vertical wall 30 above the wall 26, and the portions of the side walls 18 and 20 above the horizontal wall 26 and between the vertical walls 28 and 30.

A fourth, rearmost compartment 46 is defined by the bottom wall 22, the vertical wall 30, the rear wall 16 and the portions of the side walls 18 and 20 between the vertical wall 30 and the rear wall 16.

The third compartment 44 is subdivided, front to rear, by a pair of vertically disposed walls 48 and 50 that are integrally molded parts of the box 12. These walls are evenly spaced between the vertical walls 28 and 30 and extend between the side walls 18 and 20. Four integral, vertically disposed walls 52 further subdivide the space in the third compartment between the vertical walls 30 and 50. These walls 52 extend, front to rear, between the vertical walls 30 and 50 and are evenly spaced between the side walls 18 and 20. Four sets of matching and facing pairs of grooves 53 are integrally formed on and evenly spaced along the walls 48 and 50. These sets of grooves are vertically disposed and are adapted to receive removable walls, as shown at 54 in FIG. 3, which may be selectively used to further subdivide the interior of the third compartment 44. The height of the walls 48, 50, 52, and 54, upwardly from the horizontal wall 26, is less than the height of the side walls 18 and 20 and the vertical walls 28 and 30. A space is thus defined above the upper ends of these vertical walls.

A selectively removable storage tray 58, such as shown in FIG. 3, may be selectively disposed within this space above the vertical walls 48-54 when the box 10 is in both its horizontal in-use and upright-carry positions. Alternatively, the tray 58 may be removed from the box to separately store and transport baits, tackle, accessories, and equipment. The tray 58 includes an integral, up-turned edge wall 59 about its periphery. The interior of the storage tray 58 is subdivided by a pair of vertical, evenly spaced, transverse walls 60, and a pair of vertical, front-to-back directed walls 61 that extend between the forward-most of the transverse walls 60 and the front portion of the edge wall 59. The tray also includes six sets of matched and facing pairs of grooves 62 that are integrally formed on and evenly spaced along the walls 60 and the rear portion of the edge wall 59. These sets of grooves 62 are adapted to selectively receive removable walls 64 that may be further used to subdivide the interior of the tray.

The fourth compartment 46 may also be subdivided. Six sets of matching and facing pairs of vertically disposed grooves 66 are integrally formed on the rear wall 16, on the facing surface of the vertical wall 30 and on the facing portions of the side walls 18 and 20 that serve to define the fourth compartment. Removable walls 68 are adapted to be disposed in the sets of grooves 66 on the walls 16 and 30. These walls 68 has a set of matched and back-to-back pairs of vertically disposed grooves 69 formed mid-way between their ends. These pairs of grooves 69 face sideways when the edges of the walls 68 are disposed within the opposite pairs of grooves 66 on the walls 16 and 30. Other removable walls 70 are adapted to fit in the grooves 66 on the side walls and on the walls 68.

The upper ends of the walls 68 and 70 have a plurality of notches 71. Spinner baits and fish hooks may be hung from these notches 71.

The height of the walls 68 and 70 are substantially equal to the heights of the walls 16 and 30. The fourth compartment 46 thus offers a selectively changeable sized storage space that has a depth equal to that of the box 10.

An upwardly facing drawer 72 is mounted in and adapted to be slidingly received within the first compartment 40 through the opening 32 in the front wall 14. The drawer includes a molded plastic body 74 having a number of integrally molded interior walls 75 that serve to divide the interior of the drawer into separate storage areas.

The drawer 72 also includes a molded plastic front face plate 76, secured by rivets, not shown, to the front 78 of the body 74. The face plate 76 extends completely across the front of the body 74. It includes a rearwardly projecting flange along its sides and bottom edges that are spaced from the sides and bottom of the body 74 so as to define a groove therebetween. When the drawer 72 is positioned completely within the first compartment 40, the side and bottom edges of the walls 18, 20 and 22, that define the opening 32, are adapted to be received within this groove so as to provide a snug, tongue-and-groove like seal between the body 12 and the drawer 72.

The size of the drawer 72 is such that its body 74 completely fills the interior of the first compartment 40 when the drawer is pushed into the compartment so that the face plate 74 abuts against the adjacent parts of the body 12. When the drawer is thus completely within the compartment 40, the drawer is in a first or closed position, such as illustrated in FIGS. 1, 4, and 5, in which no access may be had to the interior of the drawer 72 from without the box 10.

The drawer 72 may be easily moved to a second or open position, such as shown in FIG. 3, wherein it is pulled out of the first compartment 40 so that access may be had to its interior. Because both the drawers and the body 12 are made of plastic, the plastic-to-plastic contact facilitates the sliding movement of the drawer with respect to the body 12.

A generally U-shaped, conventional "luggage type" plastic handle is secured to the center of the front plate 78, that is, equidistant 80 between the sides of the drawer 72. The handle 80 is free to pivot about a horizontal axis. As discussed more specifically hereinafter, the handle 80 may be used to pull the drawer 72 out of the first compartment 40 and may also be used to carry the box 10 when the box is in its upright-carry position that is, when the rear wall 16 is substantially parallel to the ground and the walls 18, 20 and 22 are substantially perpendicular to the ground.

A pair of conventional, over-center type latches 82 and 84 are also mounted on projections 85 molded on the face plate 78. Each of these latches is spaced midway between the center of the plate 78 and the side of the plate 78. As more specifically described hereinafter, these latches are adapted to secure and retain the drawer 72 in its closed position within the first compartment 40 when they are latched.

A lid assembly 86 is adapted to overlie and close the upper open end 24 of the body 12. The assembly 86 includes a rear part 88 and a front part 90. Conventional hinges 98 and 94 are used to secure the rear edge of the rear part 88 to the upper edge of the rear wall 16. These hinges 92 and 94 permit the rear part 88, and thus the entire lid assembly 86, to be pivoted about a horizontal axis between a first, closed position wherein the lid assembly 86 overlies the entire upper open end 24 and a second, open position where the assembly 86 has been pivoted away from open end 24 so that ready access may be had to things stored in the second, third and fourth compartments 42, 44 and 46.

The front part 90 of the lid assembly 86 is pivotally connected with the rear part 88. More specifically, the front part 90 has a pair of ears 96 that are integrally molded on the ends of the rear edge of the front part and that project rearwardly and upwardly from the rear edge of the front part. Matching recesses 97 are molded at the ends of the forward edge of the rear part 90. The ears 96 are disposed within these recesses 97. Horizontally disposed plastic hinge pins 98 extend through the ears 96 and the adjacent wall portions of the part 90 that define the recesses 97. The longitudinal axes of these pins 98 are co-axial. The ears 96 are mounted on these pins 98 so that the front part 88 may be pivoted about the aligned horizontal axes of the pins.

The front part 90 of the lid assembly includes two integral sub-parts; a main sub-part 100 and a forward, depending sub-part 102. The planes of these sub-parts are disposed at an angle of approximately ninety degrees with respect to each other, and the two sub-parts are connected by a smoothly curved middle section 103. When the lid assembly 86 is in its first, closed position, the plane of the main sub-part 100 is generally parallel to but spaced slightly below the plane of the rear part 88. In this position, as shown in FIGS. 1, 4 and 5, the forward sub-part 102 overlies the upper portion of the front wall 14, and its distal edge 104 overlies the upper edge of the face plate 78 of the drawer 72.

A pair of projecting latch lugs 106 are molded on the exterior surface of the sub-part 102, as seen in FIG. 6, so as to be aligned with the latches 82 and 84. When the assembly 86 is in its first position and the front part 90 is disposed so that its sub-part 102 overlies the upper edge of the face plate 78, the latches 82 and 84 may selectively cooperate with the lugs 106 so as to secure the lid assembly 86 in its first, closed position. By this securing action, the latches 82 and 84 similarly retain and secure the drawer 72 in its closed position within the first compartment 40. In other words, the latches 82 and 84 perform the dual function of holding the lid assembly 86 in its first, closed position and retaining the drawer 72 in its closed position within the first compartment 40. This, of course, facilitates the transportation of the box 10 when the box is in its upright-carry position.

As best illustrated in FIGS. 2 and 6, the part 90 of the lid assembly 86 may be pivoted about the horizontal axes of the hinge pins 98 between: a first, closed position, as shown in FIGS. 1, 4 and 5, wherein the distal edge 104 of the sub-part 102 overlies the upper edge of the face plate 78; and a second, open position, as shown in FIGS. 2 and 6, wherein the main sub-part 100 rests on the exterior of the rear portion 88. When the box 10 is in its horizontal in-use position and the part 90 has been moved to its second open position, ready access may be had to things in the second compartment 42. It is important to note that when such access to the second compartment 42 is available, the rear part 88 of the lid assembly 86 still closes or covers the third and fourth compartments 44 and 46 and the drawer 72 may be maintained in its closed position within the first compartment 40. Thus, a fisherman may, for example, place a day's supply of baits, tackle and equipment in the second compartment 42 and can have ready access to that supply without the necessity of ever fully opening, and exposing to the elements, the remaining equipment and things stored in the other compartments of the box. A strip of polyfoam plastic material 108 is secured, by conventional adhesive, to the inside surface of the main sub-part 100 of the forward part 90. Fishing hooks may be imbedded in this plastic strip 108. Thus this strip 108 serves to facilitate the organization and storage of hooks in the second compartment 42.

A separate container 110, made of molded plastic and including a base 112, and a snap-on lid 114, may be stored within the second compartment 42. This container 110 may serve as a wet and scent well and is adapted to be tightly sealed so that it can be used to store soaking pork rind or other scents. The container 110 may, of course, be easily removed from the second compartment 42 and could be, for example, stored in any of the other compartments 44 or 46, if desired.

In conclusion, the invention described herein may be embodied in other specific forms without departing from the spirit or central characteristics thereof. The preferred embodiment, described hereinabove, is thus to be considered in all respects as illustrative and not restrictive. The scope of the invention is indicated by the appended claims, rather than by the foregoing description. All changes which come within the meaning and range of equivalency of the claims are therefore intended to be embraced therein.

I claim:

1. In a satchel-style box adapted for permitting ready and facile access to all stored tackle, baits, fishing accessories and other equipment when the box is disposed in a horizontal in-use position and for storing and transporting the tackle, baits, fishing accessories, and other equipment while the box is disposed in an upright-carry position; the satchel-style box including a one-piece, molded plastic body having a front wall, having an opening therein a rear wall, a bottom wall, first and second side walls, an open, upper end, and a first, horizontally disposed interior wall positioned upwardly from the bottom wall and extending between the side walls and rearwardly from the front wall toward the rear wall, with portions of the front wall, side walls, bottom wall, and the first interior wall defining a first storage compartment in the body; the bottom wall of the box being capable of supporting the box horizontally when the box is in its horizontal in-use position; an upwardly facing drawer disposed in the front opening, with the drawer being selectively slidable between a closed position wherein its interior is within the first compartment and an open position wherein the drawer extends out beyond the front wall so that access may be had to its interior from without the box; means for selectively holding the drawer in its closed position; and handle means for permitting the box to be held in its upright-carry position wherein the front wall of the box then faces upwardly; and the rear wall of the box being capable of supporting the box when the box is disposed in its normal carry position, the improvement comprising:

a second, vertically disposed interior wall integrally molded in the body, with the second interior wall being positioned adjacent to the front wall, extending between the side walls and upwardly from the first interior wall;

the second interior wall, the front wall, the first interior wall, and the portions of the side walls, forward of the first interior wall, defining a second storage compartment within the box and the second interior wall, the rear wall, and the portions of the side walls, rearward of the second interior wall, defining a third storage compartment in the box;

a lid assembly for selectively closing the upper end of the body, the lid assembly including a rear lid portion adapted to overlie and close the upper end of the third storage compartment and a front lid portion adapted to overlie and close the upper end of the second storage compartment;

means for connecting the lid assembly to the body, adjacent to the rear wall, and for permitting the lid assembly to be selectively moved between a first, closed position wherein the lid assembly overlies and closes the upper end of the body and a second, open position wherein the lid assembly no longer overlies the open upper end of the body so that access may be had to the interior of the second and third storage compartments through the upper open end of the body;

means for connecting the front lid portion with the rear lid portion so that the front lid portion may be selectively moved, relative to the rear lid portion, between a closed position wherein the front and rear lid portions are disposed in generally parallel planes and an open position wherein the plane of the front lid portion is disposed at an angle with respect to the plane of the rear lid portion so that when the box is in its horizontal in-use position and the lid assembly is in its first, closed position, the front lid portion may be selectively moved between its closed and open positions so as to permit access to the interior of the second storage compartment while the rear lid portion remains in its first, closed position and continues to overlie the upper end of the third storage compartment; and means for selectively retaining the lid assembly in its first, closed position.

2. The improved satchel-style box described in claim 1 which includes a third vertically disposed interior wall integrally molded in the body, with the third interior wall being positioned between the second interior wall and the rear wall and extending between the side walls and upwardly from the bottom wall so that the rearwardly facing end of the first interior wall contacts the third interior wall between the bottom wall and the upper end of the third interior wall; and wherein the third interior wall subdivides the third storage compartment into a forward storage portion and a rearward storage portion.

3. The improved satchel-style box described in claim 2 wherein a selectively removable tray is adapted to be deposed within the forward storage portion of the third storage compartment; and wherein the rearward storage portion extends, in a top to bottom direction, from the bottom wall to the upper end of the body.

4. The improved satchel-style box described in claim 1 wherein the drawer includes a front face portion; wherein the handle means is mounted on the front face portion and may also be used to pull the drawer open when the drawer holding means is not holding the drawer in its closed position.

5. The improved satchel-style box described in claim 4 wherein the means for selectively holding the drawer in its closed position and the means for selectively retaining the lid assembly in its first, closed position include latch means mounted to the front face of the drawer.

6. The improved satchel-style box described in claim 1 wherein the front lid portion of the lid assembly includes a main part and a forward, depending part; wherein the forward depending part overlies the upper portion of the front wall of the body when the lid assembly is in its first, closed position and the front lid portion is in its closed position; wherein the plane of the main part is parallel to but offset below the plane of the rear lid portion when the lid assembly is in its first, closed position and the front lid portion is in its closed position; and wherein the main part may rest on the exterior of the rear lid portion when the front lid portion is in its open position.

7. The improved satchel-style box described in claim 6 wherein means for receiving and holding fish hooks is mounted on the interior surface of the main part of the first lid portion; wherein at least one of the side wall includes a drain hole that permits drainage of water from the second compartment; and wherein a measuring ruler is formed on the upper portion of the front wall of the body.

8. The improved satchel-style box described in claim 2 wherein the drawer includes a front face portion; wherein the handle means is mounted on the front face portion and may also be used to pull the drawer open when the drawer holding means is not holding the drawer in its closed position.

9. The improved satchel-style box described in claim 8 wherein the front lid portion of the lid assembly includes a main part and a forward, depending part; wherein the forward depending part overlies the upper portion of the front wall of the body when the lid assembly is in its first, closed position and the front lid portion is in its closed position; wherein the plane of the main part is parallel to but offset below the plane of the rear lid portion when the lid assembly is in its first, closed position and the front lid portion is in its closed position; and wherein the main part may rest on the exterior of the rear lid portion when the front lid portion is in its open position.

10. The improved satchel-style box described in claim 9 wherein the means for selectively holding the drawer in its closed position and the means for selectively retaining the lid assembly in its first, closed position include latch means mounted to the front face of the drawer.

11. The improved satchel-style box described in claim 10 wherein a selectively removable tray is adapted to be deposed within the forward storage portion of the third storage compartment; wherein means for receiving and holding fish hooks is mounted on the interior surface of the main part of the first lid portion, wherein at least one of the side walls includes a drain hole that permits drainage of water from the second compartment; and wherein a measuring ruler is formed on the upper portion of the front wall of the body.

* * * * *